(12) United States Patent  
Venkataraman (10) Patent No.: US 8,588,763 B2
(45) Date of Patent: Nov. 19, 2013

(54) METHODS FOR TESTING WIRELESS ELECTRONIC DEVICES USING SHORT MESSAGE SERVICE

(75) Inventor: Vishwanath Venkataraman, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/345,993

(22) Filed: Jan. 9, 2012

(65) Prior Publication Data

US 2013/0178203 A1 Jul. 11, 2013

(51) Int. Cl.
*H04W 24/00* (2009.01)
(52) U.S. Cl.
USPC ............... 455/423; 455/67.11; 455/67.14; 379/27.04; 379/29.01; 375/224
(58) Field of Classification Search
USPC ........ 455/424, 67.14, 423, 226.1, 425, 115.1, 455/73, 67.11; 343/703; 340/635, 514; 375/224; 324/756.04, 750.26, 750.25; 714/715, 724; 702/117; 379/27.04, 379/29.01
See application file for complete search history.

(56) References Cited

U.S. PATENT DOCUMENTS

| | | | | |
|---|---|---|---|---|
| 5,425,076 A * | 6/1995 | Knippelmier | ............... | 379/27.04 |
| 5,809,108 A * | 9/1998 | Thompson et al. | ........ | 379/10.02 |
| 6,606,064 B1 * | 8/2003 | Lusterman | ..................... | 343/703 |
| 6,628,130 B2 * | 9/2003 | Williams et al. | ......... | 324/755.05 |
| 6,636,061 B1 * | 10/2003 | Crook et al. | ............. | 324/756.04 |
| 6,862,682 B2 | 3/2005 | Louden et al. | | |
| 7,010,295 B1 * | 3/2006 | Zerlan et al. | .................. | 455/424 |
| 7,610,529 B2 * | 10/2009 | Yang | .............................. | 714/724 |
| 7,809,368 B2 * | 10/2010 | Logan | ............................ | 455/423 |
| 7,847,742 B2 * | 12/2010 | Sommerfeld et al. | ........ | 343/703 |
| 7,987,397 B2 | 7/2011 | Yang | | |
| 8,265,619 B1 * | 9/2012 | Hyde et al. | ...................... | 455/424 |
| 2004/0266423 A1 * | 12/2004 | Morikawa et al. | ............ | 455/424 |
| 2005/0222933 A1 * | 10/2005 | Wesby | ............................. | 705/36 |
| 2006/0128373 A1 | 6/2006 | Cochrane et al. | | |
| 2007/0165825 A1 * | 7/2007 | Ko et al. | ........................ | 379/219 |
| 2010/0113011 A1 | 5/2010 | Gregg et al. | | |
| 2011/0084887 A1 * | 4/2011 | Mow et al. | ..................... | 343/703 |

FOREIGN PATENT DOCUMENTS

EP 2392932 6/2010

OTHER PUBLICATIONS

Gregg et al., U.S. Appl. No. 12/266,536, filed Nov. 6, 2008.
Song et al., U.S. Appl. No. 13/204,617, filed Aug. 5, 2011.
Gregg et al., U.S. Appl. No. 13/035,026, filed Feb. 25, 2011.
Gregg et al., U.S. Appl. No. 13/018,348, filed Jan. 31, 2011.

* cited by examiner

*Primary Examiner* — Mahendra Patel
(74) *Attorney, Agent, or Firm* — Treyz Law Group; Jason Tsai (57) ABSTRACT

A device under test (DUT) may be tested using a radio-frequency test station. A test station may include a test host, a test unit coupled to the test host, and a shielded enclosure. The shielded enclosure may contain a test antenna that is coupled to the test unit via a radio-frequency cable. The DUT may be placed in the shielded enclosure during testing. The DUT may not be electrically wired to the test host. The test host may direct the test unit to transmit control signals in the form of a text message using Short Message Service (SMS) so that the DUT is placed into different desired configurations during testing. The DUT may also be configured to respond by sending SMS messages back to the test unit, where the SMS messages generated by the DUT includes radio-frequency performance metrics measured using the DUT.

8 Claims, 8 Drawing Sheets

METHODS FOR TESTING WIRELESS ELECTRONIC DEVICES USING SHORT MESSAGE SERVICE

BACKGROUND

This relates generally to wireless electronic devices and, more particularly, to testing of wireless electronic devices.

Wireless electronic devices typically include transceiver circuitry, antenna circuitry, and other radio-frequency circuitry that provide wireless communications capabilities. During testing, wireless electronic devices under test (DUTs) can exhibit different performance levels depending on whether each DUT has been properly designed and manufactured. For example, each wireless DUT in a group of DUTs can exhibit its own output power level, gain, frequency response, efficiency, linearity, dynamic range, downlink sensitivity, etc.

The uplink and downlink performance of a wireless DUT can be measured using a radio-frequency (RF) test station. An RF test station typically includes a test host, a tester (i.e., a signal generator/analyzer), and a shielded box (often referred to as a test cell). The tester is connected to the test host. Connected in this way, the test host can configure the tester to transmit downlink radio-frequency signals during test operations.

In conventional radio-frequency test arrangements, a wireless DUT having, for example, a cellular telephone transceiver configured to operate using a Code Division Multiple Access (CDMA) wireless communications protocol may be placed into the test cell. The DUT is connected to the test host via a Universal Serial Bus (USB) cable (i.e., the DUT is "tethered" to the test host). A protocol-compliant connection is established between the tester and the DUT (i.e., radio-frequency signals are conveyed between the tester and the cellular telephone transceiver of the DUT using the CDMA protocol). Depending on test results gathered using the tester, a test operator may determine whether the DUT satisfies design criteria.

Electronic devices that are operable across different wireless communications protocols have recently been developed (e.g., electronic devices containing wireless communications circuitry capable of supporting cellular telephone protocols such as the Long Term Evolution (LTE) protocol, Global System for Mobile Communications (GSM) protocol, Code Division Multiple Access (CDMA) protocol, Universal Mobile Telecommunications System (UMTS) protocol, etc.). Conventional test methods and equipment, however, are only capable of testing the operation of a DUT operating using a subset of existing communications protocols and are incapable of testing the operation of the DUT across all wireless communications protocols. For example, only transitions between CDMA and LTE and only transitions between UMTS and LTE are supported. Testers that support such transitions in testing are expensive and require unacceptably long test times. Moreover, the presence of the USB cable that is connected to the DUT during conventional test arrangements reduces the accuracy of radio-frequency test measurements.

It would therefore be desirable to be able to provide improved ways for performing over-the-air testing.

SUMMARY

Test stations in a radio-frequency test system can be used to perform wireless testing on wireless devices under test (DUTs). Each test station may include a test host, a test unit (sometimes referred to as a tester), and a shielded enclosure (e.g., a shielded test box such as a transverse electromagnetic cell or other suitable types of test boxes and chambers). During wireless testing, a DUT may be placed within the shielded enclosure. The DUT need not be directly coupled to the test host. Radio-frequency test signals may be conveyed between the test unit and the DUT using a test antenna contained within the shielded enclosure.

In one suitable test arrangement, the test station may be configured to perform path loss calibration. During path loss calibration operations, the test host may broadcast test signals at a requested output power level. The DUT may receive the test signals and compute the received power level (e.g., for non-CDMA based connections). The DUT may then respond by sending the computed receive power level in the form of a text message using Short Messaging Service (SMS) back to the test host (as an example). The test host may subsequently compute a downlink path loss by calculating the difference between the requested output power level and the computed receive power level.

In another suitable test arrangement, the test station may be configured to perform downlink sensitivity testing. During downlink sensitivity testing, a DUT may first synchronize with the test unit. The test unit may then broadcast test signals at a target output power level that takes into account the precalibrated path loss of the test station. The DUT may receive the test signals and measure the signal quality of the received test signals (e.g., the DUT may measure the bit error rate, symbol error rate, and/or frame error rate associated with the received test signals). The DUT may be configured to send the computed error rate information back to the test unit in the form of an SMS message (as an example).

In other suitable test arrangement, the test host may direct the test unit to send control signals in the form of SMS messages that configure the DUT to operate in different desired modes during testing. As an example, the test host may send an SMS message that directs the DUT to switch from transmitting wireless signals using a first wireless network communications protocol to transmitting wireless signals using a second wireless network communications protocol that is different than the first wireless network communications protocol. As another example, the test host may send an SMS message that directs the DUT to toggle on/off selected peripheral devices (e.g., to turn on or off peripheral components such as the DUT's camera module, display module, audio module, or other input-output modules that are not required for wireless transmission). As another example, the test host may send an SMS message that directs the DUT to selectively enable its antenna circuitry so that only a selected portion of its transceiver circuitry is turned on, so that the activated transceiver circuitry is switchably coupled to the desired number of antennas, etc.

Further features of the present invention, its nature and various advantages will be more apparent from the accompanying drawings and the following detailed description.

DETAILED DESCRIPTION

Electronic devices may be provided with wireless communications circuitry. The wireless communications circuitry may be used to support wireless communications in multiple wireless communications bands. The wireless communications circuitry may include multiple transmit and receive antennas arranged to implement an antenna diversity system.

The antennas can include loop antennas, inverted-F antennas, strip antennas, planar inverted-F antennas, slot antennas, hybrid antennas that include antenna structures of more than one type, or other suitable antennas. Conductive structures for the antennas may be formed from conductive electronic device structures such as conductive housing structures (e.g., a ground plane and part of a peripheral conductive housing member or other housing structures), traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
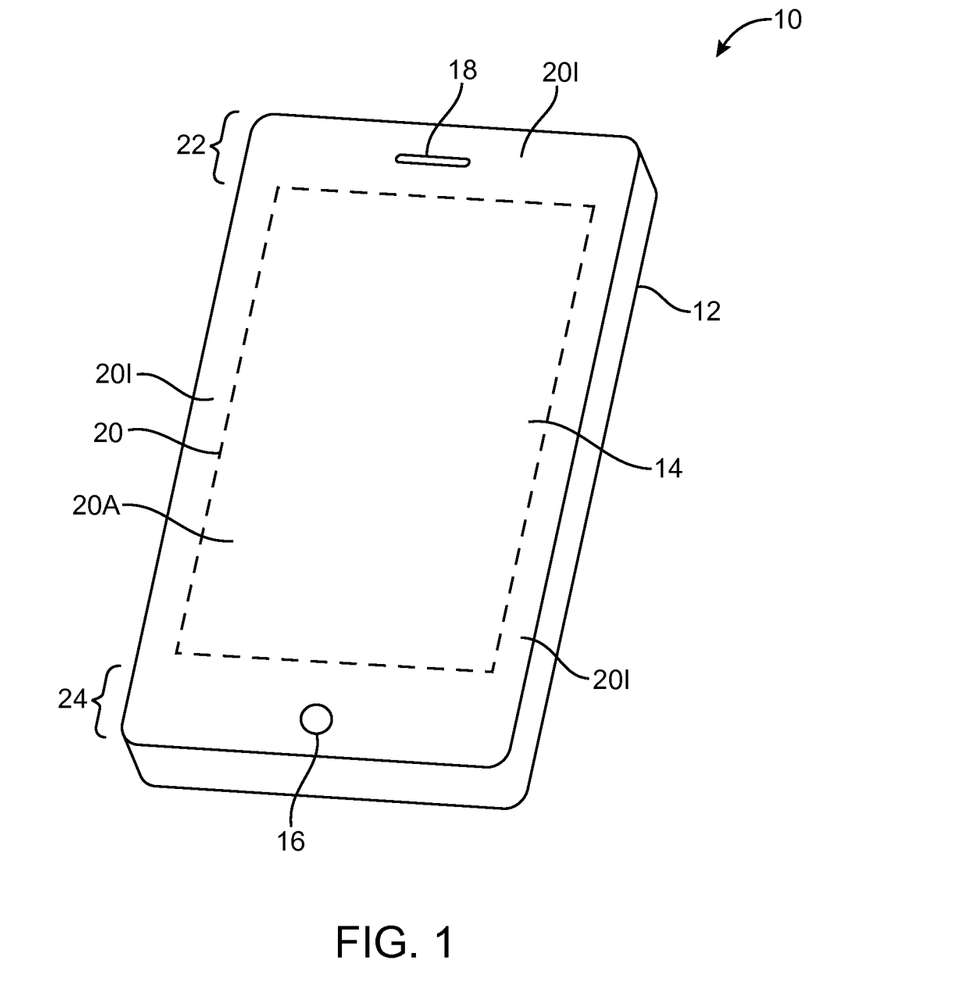
FIG. 1 is a perspective view of an illustrative electronic device with wireless communications circuitry in accordance with an embodiment of the present invention.

An illustrative electronic device of the type that may be provided with one or more antennas (e.g., two antennas, three antennas, four antennas, five or more antennas, etc.) is shown in FIG. 1. Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed form light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 201 may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10 if desired.

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas). Antenna structures may also be provided in regions 22 and/or 24 to handle WiMax (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as an inverted-F antenna resonating element formed from part of a conductive peripheral housing structure in device 10 from the ground plane, or may otherwise serve as part of antenna structures formed in regions 22 and 24.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs. For example, the first antenna in region 24 may cover all cellular telephone bands of interest (e.g., four or five bands) and the second antenna in region 22 may cover a subset of the four or five bands handled by the first antenna. Arrangements in which the antenna in region 24 handles a subset of the bands handled by the antenna in region 22 (or vice versa) may also be used. Tuning circuitry may be used to tune this type of antenna in real time to cover a either a first subset of bands or a second subset of bands and thereby cover all bands of interest.

To reliably receive incoming voice or data calls, device 10 should be able to receive incoming paging signals. In some situations, incoming paging signals are weak due to interference or a relatively large distance between device 10 and the transmitting cellular telephone tower. In situations such as these, multiple antennas (e.g., both antennas in a dual antenna system) may be used in receiving paging signals. Combining received signals from multiple antennas can improve received signal quality and can therefore help ensure that incoming pages are received properly, even in areas with weak signals. Use of dual antennas in receiving signals generally consumes more power than use of a single antenna in receiving signals. Device 10 may therefore revert to using only a single antenna whenever signal conditions improve.

An antenna switching algorithm that runs on the circuitry of device 10 can be used to automatically change between antenna modes in real time based on the evaluated signal quality of received signals. The antenna switching algorithm may direct device 10 to operate in a multiple antenna mode (e.g., a dual antenna mode) when incoming signals are weak and may direct device 10 to operate in a single antenna mode when incoming signals are strong (as an example). With this type of arrangement, it is not necessary to simultaneously use multiple antennas and associated receiver circuits for monitoring incoming paging signals except when paging signals are of poor quality, thereby minimizing power consumption.

Arrangements in which device 10 has a primary antenna (e.g., an antenna that typically exhibits superior performance) and a secondary antenna (e.g., an antenna whose performance typically does not exceed that of the primary antenna) are sometimes described herein as an example. This is, however, merely illustrative. Device 10 may use three or more antennas if desired. Device 10 may use antennas that are substantially identical (e.g., in band coverage, in efficiency, etc.), or may use other types of antenna configurations.

When operating in single antenna mode, either the primary or the secondary antenna may be used. For example, device 10 may default to use of the primary antenna whenever changing to single antenna mode from dual antenna mode while monitoring paging signals. If desired, device 10 may select an optimum antenna to use when transitioning from dual antenna mode to single antenna mode. Device 10 may select the optimum antenna by evaluating the signal strength on each antenna and choosing the antenna with the strongest signal or by using other suitable antenna selection criteria.

Figure 2:
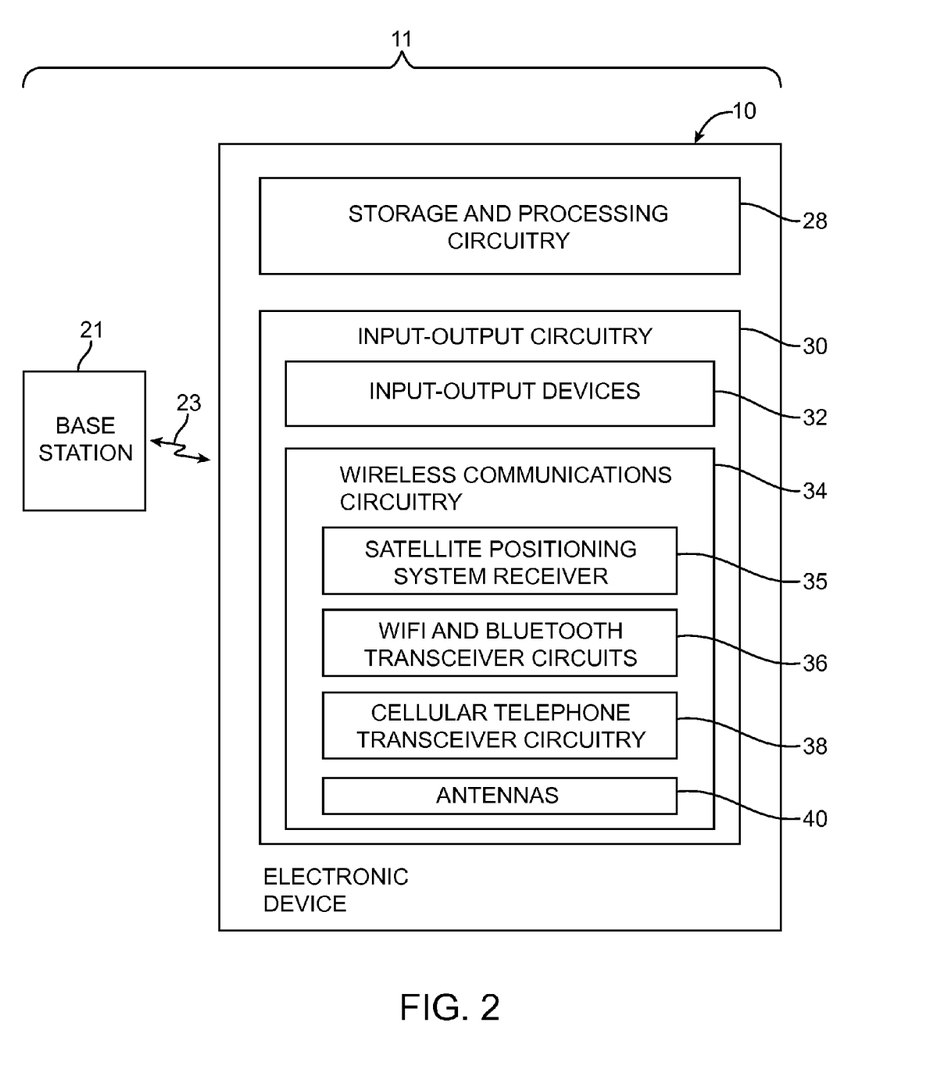
FIG. 2 is a schematic diagram of a wireless network including a base station and an illustrative electronic device with wireless communications circuitry in accordance with an embodiment of the present invention.

A schematic diagram of a system in which electronic device 10 may operate is shown in FIG. 2. As shown in FIG. 2, system 11 may include wireless network equipment such as base station 21. Base stations such as base station 21 may be associated with a cellular telephone network or other wireless networking equipment. Device 10 may communicate with base station 21 over wireless link 23 (e.g., a cellular telephone link or other wireless communications link).

Device 10 may include control circuitry such as storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communications circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VoIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the Long Term Evolution (LTE) protocol, Global System for Mobile Communications (GSM) protocol, Code Division Multiple Access (CDMA) protocol, and Universal Mobile Telecommunications System (UMTS) protocol, etc.

Circuitry 28 may be configured to implement control algorithms that control the use of antennas in device 10. For example, circuitry 28 may configure wireless circuitry 34 to switch a particular antenna into use for transmitting and/or receiving signals or may switch multiple antennas into use simultaneously. In some scenarios, circuitry 28 may be used in gathering sensor signals and signals that reflect the quality of received signals (e.g., received paging signals, received voice call traffic, received control channel signals, received data traffic, etc.). Examples of signal quality measurements that may be made in device 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc. This information may be used in controlling which antenna mode is used (e.g., single antenna mode or dual antenna mode) and may be used in selecting an optimum antenna in single antenna mode (if desired). Antenna selections can also be made based on other criteria.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals.

Wireless communications circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands at 700 MHz, 850 MHz, 900 MHz, 1800 MHz, 1900 MHz, and 2100 MHz or other cellular telephone bands of interest. Wireless communications circuitry 34 can include circuitry for other short-range and long-range wireless links if desired (e.g., WiMax circuitry, etc.). Wireless communications circuitry 34 may, for example, include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna. As described in connection with FIG. 1, there may be multiple cellular telephone antennas in device 10. For example, there may be one cellular telephone antenna in region 24 of device 10 and another cellular telephone antenna in region 22 of device 10. These antennas may be fixed or may be tunable.

Figure 3:
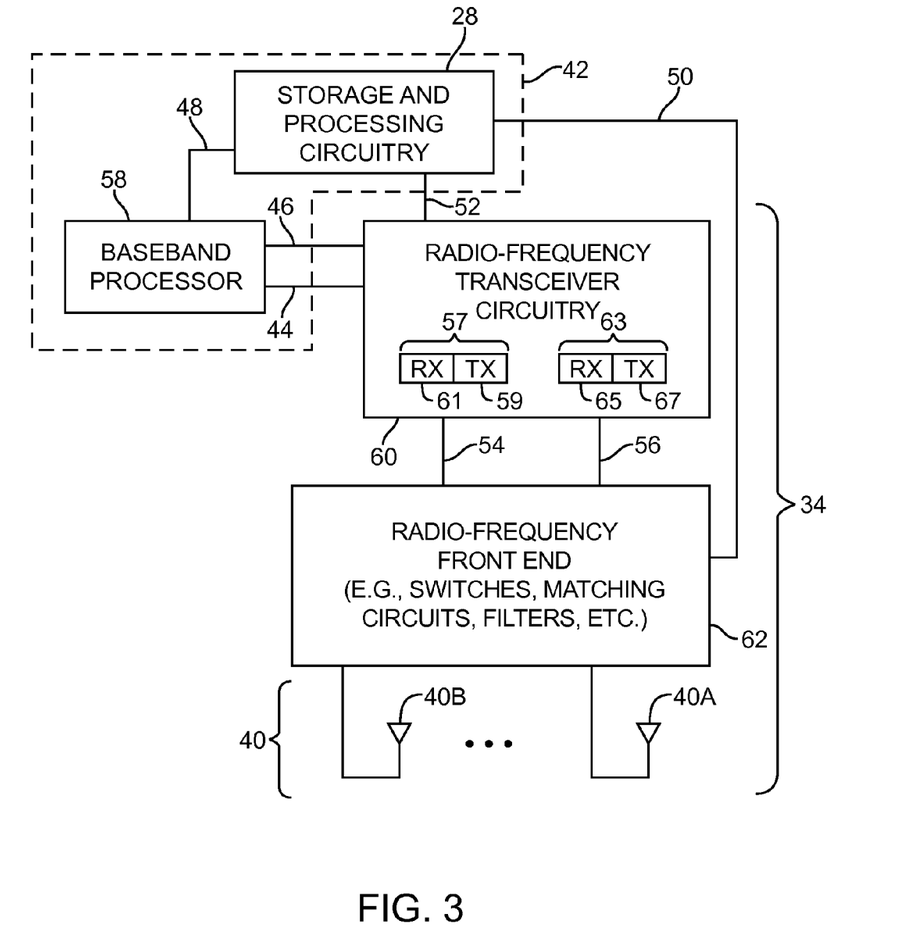
FIG. 3 is a diagram of illustrative wireless circuitry that may be used in an electronic device in accordance with an embodiment of the present invention.

Device 10 can be controlled by control circuitry that is configured to store and execute control code for implementing control algorithms (e.g., antenna diversity control algorithms and other wireless control algorithms). As shown in FIG. 3, control circuitry 42 may include storage and processing circuitry 28 (e.g., a microprocessor, memory circuits, etc.) and may include baseband processor 58. Baseband processor 58 may form part of wireless circuitry 34 and may include memory and processing circuits (i.e., baseband processor 58 may be considered to form part of the storage and processing circuitry of device 10).

Baseband processor 58 may provide data to storage and processing circuitry 28 via path 48. The data on path 48 may include raw and processed data associated with wireless (antenna) performance metrics for received signals such as received power, transmitted power, frame error rate, bit error rate, channel quality measurements based on received signal strength indicator (RSSI) information, channel quality measurements based on received signal code power (RSCP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers such as transceivers 57 and 63 (e.g., one or more transceivers that are shared among antennas, one transceiver per antenna, etc.). In the illustrative configuration of FIG. 3, radio-frequency transceiver circuitry 60 has a first transceiver such as transceiver 57 that is associated with path (port) 54 (and which may be associated with path 44) and a second transceiver such as transceiver 63 that is associated with path (port) 56 (and which may be associated with path 46). Transceiver 57 may include a transmitter such as transmitter 59 and a receiver such as receiver 61 or may contain only a receiver (e.g., receiver 61) or only a transmitter (e.g., transmitter 59). Transceiver 63 may include a transmitter such as transmitter 67 and a receiver such as receiver 65 or may contain only a receiver (e.g., receiver 65) or only a transmitter (e.g., transmitter 59).

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by transmitters 59 and 67 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60 such as receiver 61 at port 54 and receiver 63 at port 56, and paths such as paths 44 and 46. Baseband processor 58 may convert these received signals into digital data that is provided to storage and processing circuitry 28. Baseband processor 58 may also extract information from received signals that is indicative of signal quality for the channel to which the transceiver is currently tuned. For example, baseband processor and/or other circuitry in control circuitry 42 may analyze received signals to produce bit error rate measurements, measurements on the amount of power associated with incoming wireless signals, strength indicator (RSSI) information, received signal code power (RSCP) information, signal-to-interference ratio (SINR) information, signal-to-noise ratio (SNR) information, channel quality measurements based on signal quality data such as Ec/Io or Ec/No data, etc. This information may be used in controlling which antenna(s) to use in device 10. For example, a control algorithm running on control circuitry 42 may be used to place device 10 into a dual antenna mode in which both antennas are operating or a single antenna mode in which a single antenna is operating based on channel quality measurements such as these and other information. The control algorithm may also use channel quality measurements to select which antenna to use during single antenna mode operations.

Radio-frequency front end 62 may include a switch that is used to connect transceiver 57 to antenna 40B and transceiver 63 to antenna 40A or vice versa. The switch may be configured by control signals received from control circuitry 42 over path 50. Circuitry 42 may, for example, adjust the switch to select which antenna is being used to transmit radio-frequency signals (e.g., when it is desired to share a single transmitter in transceiver 60 between two antennas) or which antenna is being used to receive radio-frequency signals (e.g., when it is desired to share a single receiver between two antennas).

If desired, antenna selection may be made by selectively activating and deactivating transceivers without using a switch in front end 62. For example, if it is desired to use antenna 40B but not antenna 40A, transceiver (which may be coupled to antenna 40B through circuitry 62) may be activated and transceiver 63 (which may be coupled to antenna 40A through circuitry 62) may be deactivated. If it is desired to use antenna 40A but not antenna 40B, circuitry 42 may activate transceiver 63 and deactivate transceiver 57. Combinations of these approaches may also be used to select which antennas are being used to transmit and/or receive signals. When it is desired to receive incoming signals such as paging signals using both antennas, transceiver 57 and transceiver 63 may be simultaneously activated to place device 10 in a dual antenna mode.

Control operations such as operations associated with configuring wireless circuitry 34 to transmit or receive radio-frequency signals through desired antennas 40 may be performed using a control algorithm that is implemented on control circuitry 42 (e.g., using the control circuitry and memory resources of storage and processing circuitry 28 and baseband processor 58).

Figure 4:
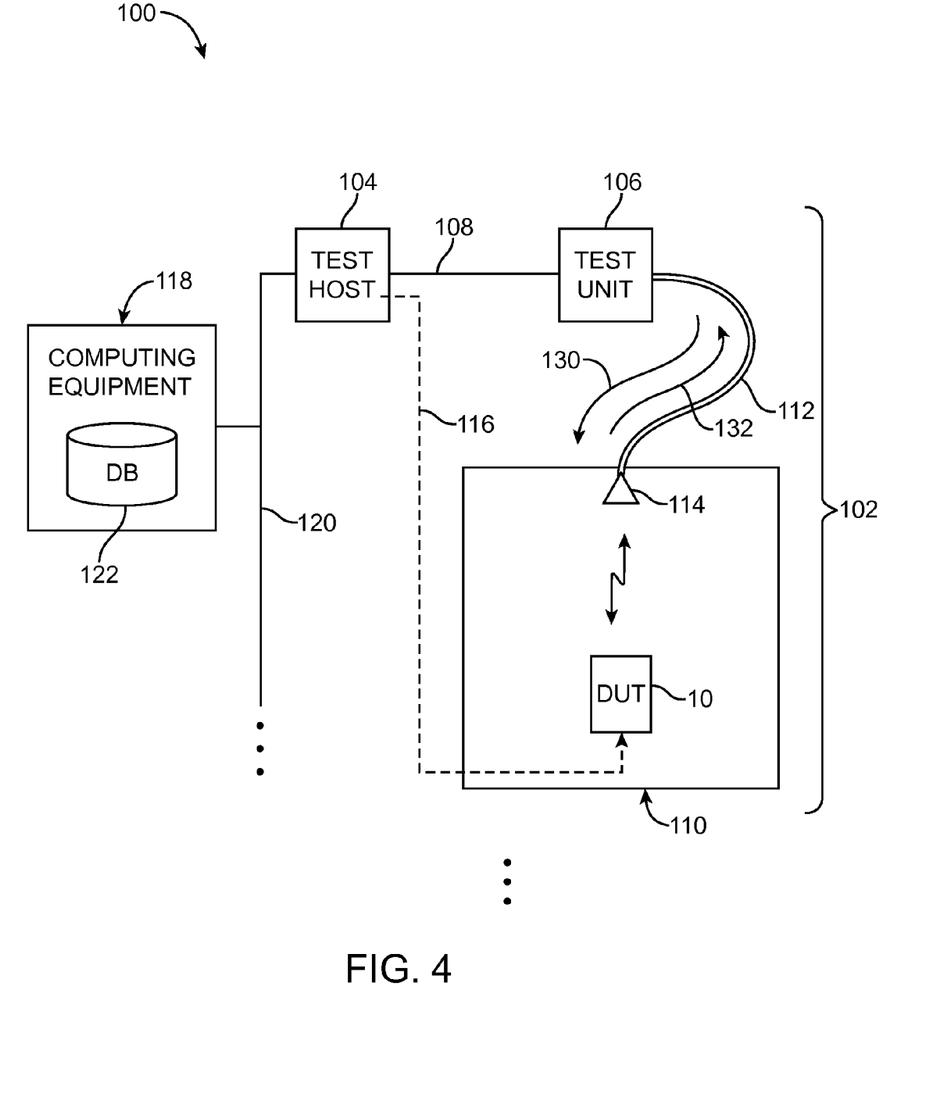
FIG. 4 is a diagram of an illustrative test station that can be used to perform over-the-air testing in accordance with an embodiment of the present invention.

During testing, many wireless devices (e.g., tens, hundreds, thousands, or more of devices 10) may be tested in a test system such as test system 100 of FIG. 4. Electronic devices that are being tested in test system 100 may sometimes be referred to as devices under test (DUTs). Test system 100 may include test accessories, computers, network equipment, tester control boxes, cabling, test enclosures, and other test equipment for generating and receiving radio-frequency test signals and gathering test results. Test system 100 may include multiple test stations such as test stations 102. There may, for example, be eighty test stations 102 at a given test site. Test system 100 may include any desired number of test stations to achieve desired test throughput.

Each test station 102 may include a test host such as test host 104, a tester such as test unit 106, and a test enclosure such as test enclosure 110. Test host 104 may, for example, be a personal computer or other types of computing equipment. Test unit 106 may be a signal generator, a spectrum analyzer, a vector network analyzer, and other testers suitable for generating radio-frequency test signals and for performing radio-frequency measurements on signals received from DUT 10. In other suitable arrangements, test unit 106 may be a radio communications tester of the type that is sometimes referred to as a call box or a base station emulator. Test unit 106 may, for example, be the CMU300 Universal Radio Communication Tester available from Rohde & Schwarz. Test unit 106 may be used to emulate the behavior of a base transceiver station during a telephone call with cellular telephone transceiver circuitry 38 to test the ability of transceiver 38 to support "2G" cellular telephone communications protocols such as the 2G GSM and 2G CDMA, 3G cellular telephone communications protocols such as UMTS and Evolution-Data Optimized (EVDO), 4G cellular telephone communications protocols such as LTE, and other suitable cellular telephone communications protocols. If desired, test unit 106 may be configured to emulate the behavior of a network access point to test the ability of transceiver 36 to support the WiFi® communications protocol, the Bluetooth® communications protocol, or other short-range wireless communications standards.

Test unit 106 may be operated directly or via computer control (e.g., when test unit 106 receives commands from test host 104). When operated directly, a user may control test unit 106 by supplying commands directly to test unit 106 using the user input interface of test unit 106. For example, a user may press buttons in a control panel on the test unit while viewing information that is displayed on a display in test unit 106. In computer controlled configurations, test host 104 (e.g., software running autonomously or semi-autonomously on the computer) may communicate with test unit 106 by sending and receiving data over a wired path 104 or a wireless path between the computer and the test unit (as an example).

During testing, at least one DUT 10 may be placed within test enclosure 110. DUT 10 may be optionally coupled to test host 104 via control line 116. The connection represented by line 116 may be a Universal Serial Bus (USB) based connection, a Universal Asynchronous Receiver/Transmitter (UART) based connection, or other suitable types of connection. During testing, test host 104 may send control signals to DUT 10 and may retrieve test data from DUT 10 via connection 116. In accordance with an embodiment of the present invention, DUT 10 is not electrically connected to test host 104.

Test enclosure 110 may be a shielded enclosure (e.g., a shielded test box) that can be used to provide radio-frequency isolation when performing electromagnetic compatibility (EMC) radiated tests without experiencing interference from outside environment. Test enclosure 110 may, for example, be a transverse electromagnetic (TEM) cell. The interior of test enclosure 110 may be lined with radio-frequency absorption material such as rubberized foam configured to minimize reflections of wireless signals. Test enclosure 110 may include in its interior wireless structures 114 for communicating over short distances using near field electromagnetic coupling (e.g., over ten centimeters or less). Wireless structures 114 in test enclosure 110 may include an inductor or other near field communications element (sometimes referred to as a near field communications test antenna or near field communications coupler) used to radiate corresponding near field electromagnetic signals to DUT 10. Test antenna 114 may be coupled to test unit 106 via a radio-frequency cable 112 (e.g., a coaxial cable). Test antenna 114 may be used during production test procedures to perform over-the-air testing on DUT 10 (e.g., so that radio-frequency test signals may be conveyed between test unit 106 and DUT 10 via antenna 114). Test antenna 114 may, as an example, be a microstrip antenna such as a microstrip patch antenna.

During testing, downlink test signals may be conveyed from test antenna 114 to DUT 10 in the direction of arrow 130, whereas uplink test signals may be conveyed from DUT 10 to test antenna 114 in the direction of arrow 132. Test radio-frequency signals may be conveyed between test unit 106 and DUT 10 over a non-protocol-compliant communications path (e.g., an unauthenticated wireless communications data link) or a protocol-compliant communications link (e.g., an authenticated wireless communications link).

DUT 10 may be loaded with a test operating system (e.g., a simplified operating system that lacks a full Internet Protocol (IP) stack implementation) or a normal user operating system (e.g., an operating system that includes a full Internet Protocol (IP) stack implementation). DUT 10 may include wireless performance measurement circuitry capable of analyzing the received test signals. As discussed previously, DUT 10 may be capable of computing and storing radio-frequency downlink metrics such as bit error rate measurements, signal-to-noise ratio measurements, measurements on the amount of power associated with incoming wireless signals, channel quality measurements based on received signal strength indicator (RSSI) information, channel quality measurements based on received signal code power (RSCP) information, channel quality measurements based on signal-to-interference ratio (SINR) and signal-to-noise ratio (SNR) information, channel quality measurements based on signal quality data such as Ec/Io or Ec/No data, etc.

As shown in FIG. 4, each test station 102 may be connected to computing equipment 118 through line 120. Computing equipment 118 may include storage equipment on which a database 122 is stored. After desired radio-frequency measurements have been gathered from DUT 10, DUT 10 may be removed from test enclosure 110. Test data may then be loaded onto associated test host 104. The test data gathered at the different test stations 102 may be stored centrally in database 122.

As discussed previously, DUT 10 need not be electrically wired to test host 104 (i.e., DUT 10 need not be "tethered" during wireless testing). Even though DUT 10 is not directly connected to test host 104, test host 104 may still be able to send control signals over-the-air to DUT 10 during testing. These control signals may serve to place DUT 10 into different desired configurations. Test host 104 may, as an example, direct test unit 106 to transmit control signals in the form of a text message using Short Message Service (SMS). Other suitable forms of wireless data transmission (e.g., multimedia messaging service) may be used, if desired.

Upon receiving the SMS message, DUT 10 may be configured to respond by transmitting radio-frequency signals containing measurements computed by DUT 10, wireless circuitry 34 of DUT 10 may be configured to transmit or receive radio-frequency signals through desired antennas 40 (e.g., by selectively enabling transceivers 57 and 63, by coupling the antennas to desired transceivers using switches in front end circuitry 62, etc.), DUT 10 may be configured to switch operation based on a first network communications protocol to a second network communications protocol that is different than the first communications protocol, DUT 10 may be configured to toggle on/off selected peripheral accessories (e.g., to selectively turn on or off its camera module, its liquid crystal display module, its audio module, transceiver circuits 36, and other input-output devices 32), etc.

Figure 5:
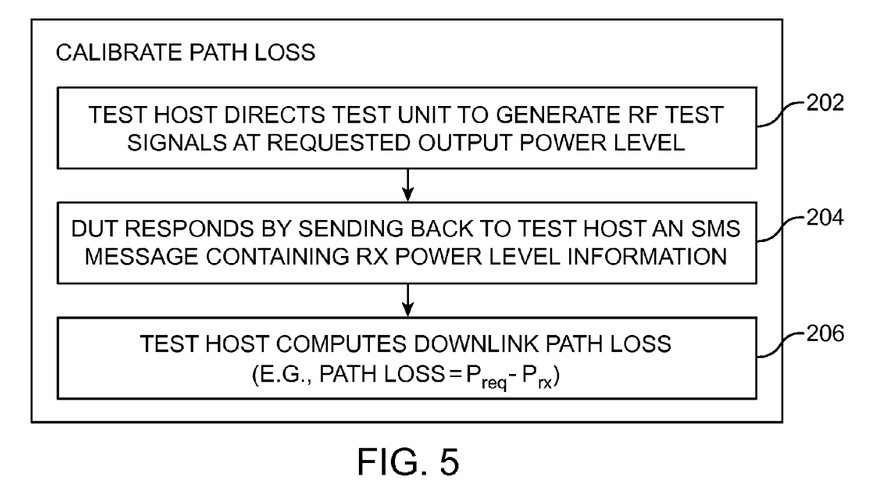
FIG. 5 is a flow chart of illustrative steps for performing path loss calibration in accordance with an embodiment of the present invention.

In one suitable embodiment of the present invention, DUT 10 may be directed to broadcast information containing measured receive power level in the form of an SMS message. FIG. 5 is a flow chart of illustrative steps involved in performing test station path loss calibration.

Each test station 102 should be calibrated prior to testing to ensure that measurements taken across the different test stations are consistent with one another. Sources of offset (error) that may exist from one test station to another include OTA path loss (e.g., path loss associated with the propagation of radio-frequency signals as they propagate through air, path loss associated with the behavior of each test antenna 114 during actual wireless transmission, etc.), RF cable path loss (e.g., path loss associated with RF cable 112), and variations in each test unit 106 (e.g., process, voltage, and temperature variations that may affect the operation of each tester).

Path loss can be defined as the attenuation in power as wireless signals propagate through a particular medium. The OTA path loss and RF cable path loss in each test station 102 are typically unique, because it is challenging to manufacture test components (e.g., test antennas 114, RF cables 112, etc.) that are exactly identical to one another and to configure each test station 102 with an identical spatial arrangement. Path loss may be sensitive to the location of the test antenna and to the placement of DUT 10 within the test chamber.

Similarly, the manufacturing of identical test units 106 may be equally if not even more challenging. In addition to manufacturing variations, operational variations such as voltage and temperature variations may cause each test unit 106 to behave differently during actual testing conditions. As a result, it may be necessary to take into account an overall test station path loss (e.g., it is necessary to calibrate the OTA path loss, RF cable path loss, and test unit variations) when testing a DUT 10.

Path loss calibration may be performed using at least one reference DUT (e.g., a golden reference DUT that has been carefully calibrated). At step 202, test host 104 may direct test unit 104 to generate radio-frequency test signals at a request output power level Preq. At step 204, DUT 10 may respond by sending back to test host 106 an SMS message containing receive power level information Prx (e.g., RSSI, RSCP, or other receive signal quality measurements). At step 206, test host 106 may compute downlink path loss by subtracting Prx from Preq. Path loss measured in this way may be recomputed multiple times using the same reference DUT, using multiple different reference DUTs, or may be calibrated using each production DUT 10 prior to being tested (as examples).

During production testing, pass/fail criteria may be applied to each DUT based on a DUT's ability to receive radio-frequency signals. The ability of DUT 10 to receive radio-frequency signals may be quantified by a receive signal sensitivity level (or downlink sensitivity). Downlink sensitivity may be defined as the minimum receive signal power level for which the received radio-frequency signals exhibit performance levels that satisfy design criteria.

For example, consider a scenario in which a maximum acceptable bit error rate is specified to be equal to 2%. A given DUT 10 may receive RF signals. If the power level of the received RF signals is equal to −99 dBm, the bit error rate may be equal to 1.9%. If the power level of the received RF signals is equal to −100 dBm, the bit error rate may be equal to 2%. If the power level of the received RF signals is equal −101 dBm, the bit error rate may be equal to 2.1%. In this example, the downlink sensitivity of the given DUT is equal to −100 dBm, because RF signals with power levels that are less than −100 dBm result in unacceptable bit error rates for the given DUT. Testing the receive signal sensitivity of electronic devices during production testing may sometimes be referred to as performing downlink sensitivity testing.

Figure 7:
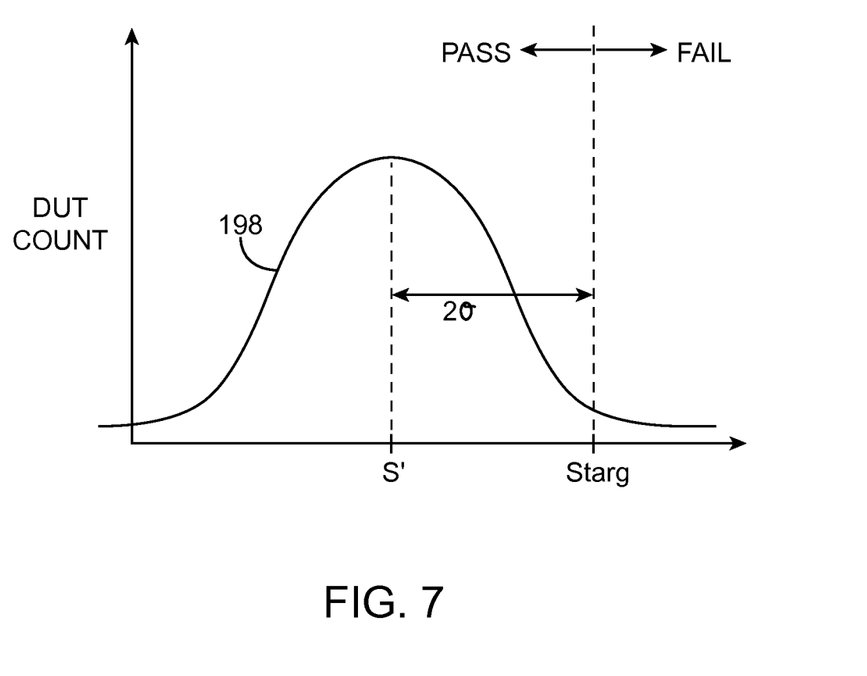
FIG. 7 is a plot illustrating a statistical distribution of downlink sensitivity for wireless devices under test in accordance with an embodiment of the present invention.

FIG. 7 is a frequency distribution plot showing a statistical distribution of DUT downlink sensitivity. Sensitivity characteristic curve 198 may be obtained by testing hundreds or thousands of DUTs 10 and measuring their sensitivity levels. Curve 198 may have a peak DUT count that corresponds to sensitivity level S'. Sensitivity level S' may correspond to the median, mean (average), or mode of an entire set of measured downlink sensitivity values (e.g., sensitivity S' is the most frequently occurring receive signal sensitivity level).

As shown in FIG. 7, curve 198 may have a substantially Gaussian profile. A majority of DUTs 10 may exhibit sensitivity levels that are within one standard deviation (e.g., one sigma) of sensitivity level S'. Approximately 68% of DUTs 10 may exhibit sensitivity levels that are within one standard deviation of sensitivity level S'. Approximately 95% of DUTs 10 may exhibit sensitivity levels that are within two standard deviations of sensitivity level S'.

It may be desirable to test the ability of production DUTs to receive RF signals at a low power level corresponding to a target sensitivity level $S_{TARG}$ (e.g., a sensitivity level that is at least two standard deviations greater than S'). For example, sensitivity level S' may be equal to −112 dBm, whereas target sensitivity level $S_{TARG}$ may be equal to −110 dBm.

During production testing, a given DUT may, for example, receive RF signals having a power level of −110 dBm. If the given DUT receives the RF signals and the received RF signals exhibit acceptable error rate performance, the given DUT has a sensitivity level that is lower than −110 dBm and will be marked as a passing DUT. If the given DUT receives the RF signals and the received RF signals exhibit unacceptable error rate performance, the given DUT has a sensitivity level that is greater than −110 dBm and will be marked as a failing DUT. A suitable $S_{TARG}$ may be selected so that 99.5% of DUTs will satisfy performance criteria and be marked as passing DUTs during production testing (as an example).

Figure 6:
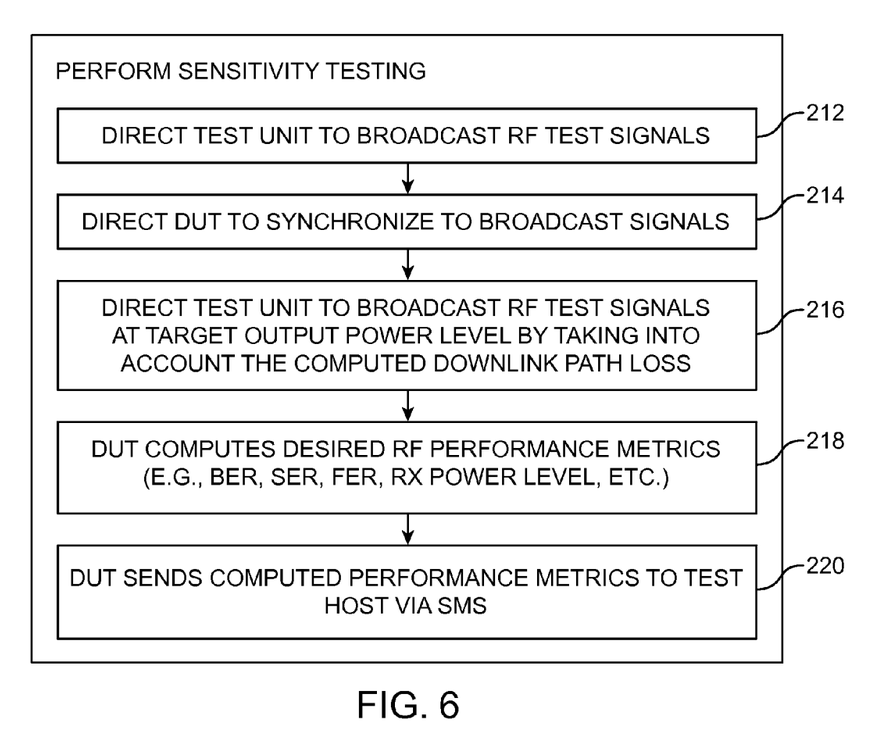
FIG. 6 is a flow chart of illustrative steps for performing downlink sensitivity testing in accordance with an embodiment of the present invention.

FIG. 6 shows illustrative steps involved in performing downlink sensitivity testing. At step 74, test host 104 may direct test unit 106 to broadcast RF initialization signals. The initialization test signals may be grouped into frames for protocol-compliant transmission (e.g., the downlink RF test signals may be organized into groups of digital signals that are transmitted by DUT 10 when DUT 10 is used to transmit protocol-compliant data). For example, each frame may include control information such as a frame header and a frame trailer and may include user data (sometimes referred to as payload). The frame header may include information such as a preamble, start frame delimiter, source and destination address, and other control information, whereas the frame trailer may include information such as cyclic redundancy check bits and other sequencing information (as an example).

For example, test unit 106 may be configured to emulate the behavior of a base transceiver station during a telephone call with a wireless device under test and to transmit data frames over a GSM-compliant link. As another example, test unit 106 may be configured to emulate the behavior of a network access point and to transmit data packets over a WiFi-compliant link.

At step 214, DUT 10 may synchronize with the initialization signals broadcast from test unit 106 (e.g., to synchronize DUT 10 to the Global System for Mobile Communications (GSM) time division multiple access (TDMA) 26-multiframe structure). DUT 10 is synchronized when it transmits uplink signals with frame headers and trailers that are respectively aligned with the frame headers and trailers of the downlink initialization signals broadcast from test unit 106.

At step 216, test host 104 may direct test unit 106 to broadcast downlink test signals at a target output power level by taking into account the pre-characterized downlink path loss (e.g., path loss values computed using the exemplary steps of FIG. 5) and target test sensitivity level $S_{TARG}$. The target output power level may be calculated by adding the magnitude of the precomputed path loss value to target sensitivity level $S_{TARG}$. For example, if $S_{TARG}$ is equal to −110 dBm and the precomputed path loss value is equal to 9 dB, the target output power level will be equal to −101 dBm (−110 plus 9).

At step 218, DUT 10 may calculate desired transmission performance metric data that is indicative of radio-frequency performance of that device under test in receiving the broadcast radio-frequency test signals. For example, each DUT 10 may receive the test signals broadcast from test unit 106 and may calculate a bit error rate (BER), symbol error rate (SER), frame error rate (FER), received signal strength indicator (RSSI), and other performance metrics based on the received test signals. DUT 10 may then send the measured performance data back to test host 106 via SMS (step 220). A test operator may subsequently determine based on the data received at test host 106 whether DUT 10 satisfies design criteria.

Figure 8:
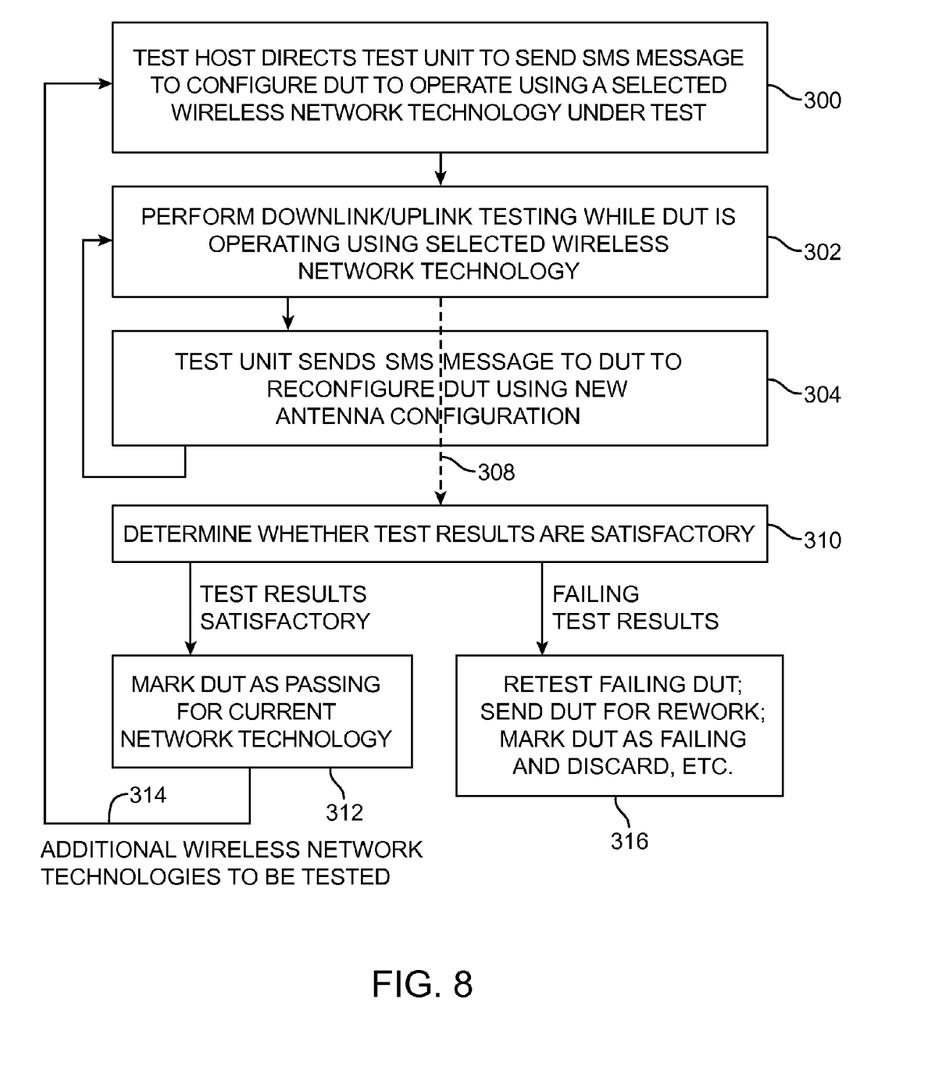
FIG. 8 is a flow chart of illustrative steps involved in testing a wireless electronic device across different wireless network technologies and different antennas in accordance with an embodiment of the present invention.

In another suitable embodiment of the present invention, test unit 106 may broadcast SMS messages that configured DUT 10 to switch among different wireless network access technologies (e.g., between operating using the GSM protocol, the CDMA protocol, the UMTS protocol, the LTE protocol, etc.). FIG. 8 is a flow chart showing illustrative steps involved in testing the operation of DUT 10 across different wireless network access technologies.

At step 300, test host 104 may direct test unit 106 to send a first SMS message that configures DUT 10 to operate using a first wireless network access technology. At step 302, desired downlink/uplink radio-frequency measurements may be performed while DUT 10 is transmitting and receiving radio-frequency test signals to and from test host 106 using the first wireless network access technology. Test unit 106 may optionally broadcast additional SMS messages that direct DUT 10 to reconfigure its current antenna setting (e.g., to selectively enable transceivers 57 and 63, to couple a selected portion of its multiple antennas to desired transceivers using switches in front end circuitry 62, etc.) so that test results reflective of different antenna configurations while DUT 10 is operating using the first wireless network access technology can be gathered.

Once sufficient data has been gathered for the first wireless network access technology, processing may proceed to step 310, as indicated by path 308. At step 310, test results may be analyzed to determine whether DUT 10 satisfies design criteria. If test results are satisfactory, DUT 10 may be marked as having a passing status for the first wireless network access technology (step 312). Processing may then loop back to step 300 to test additional wireless network access technologies, as indicated by path 314 (test unit 106 may send another SMS message to configure DUT 10 to operate using a second wireless network access technology that is different than the first wireless network access technology). If desired, any number of wireless network access technologies (e.g., any number of cellular telephone communications protocols, local area network communications protocols, internet protocols, etc.) may be tested. If test results are unsatisfactory, DUT 10 may be retested, may be marked as a failing DUT, may be scrapped or reworked, etc. (step 316).

Figure 9:
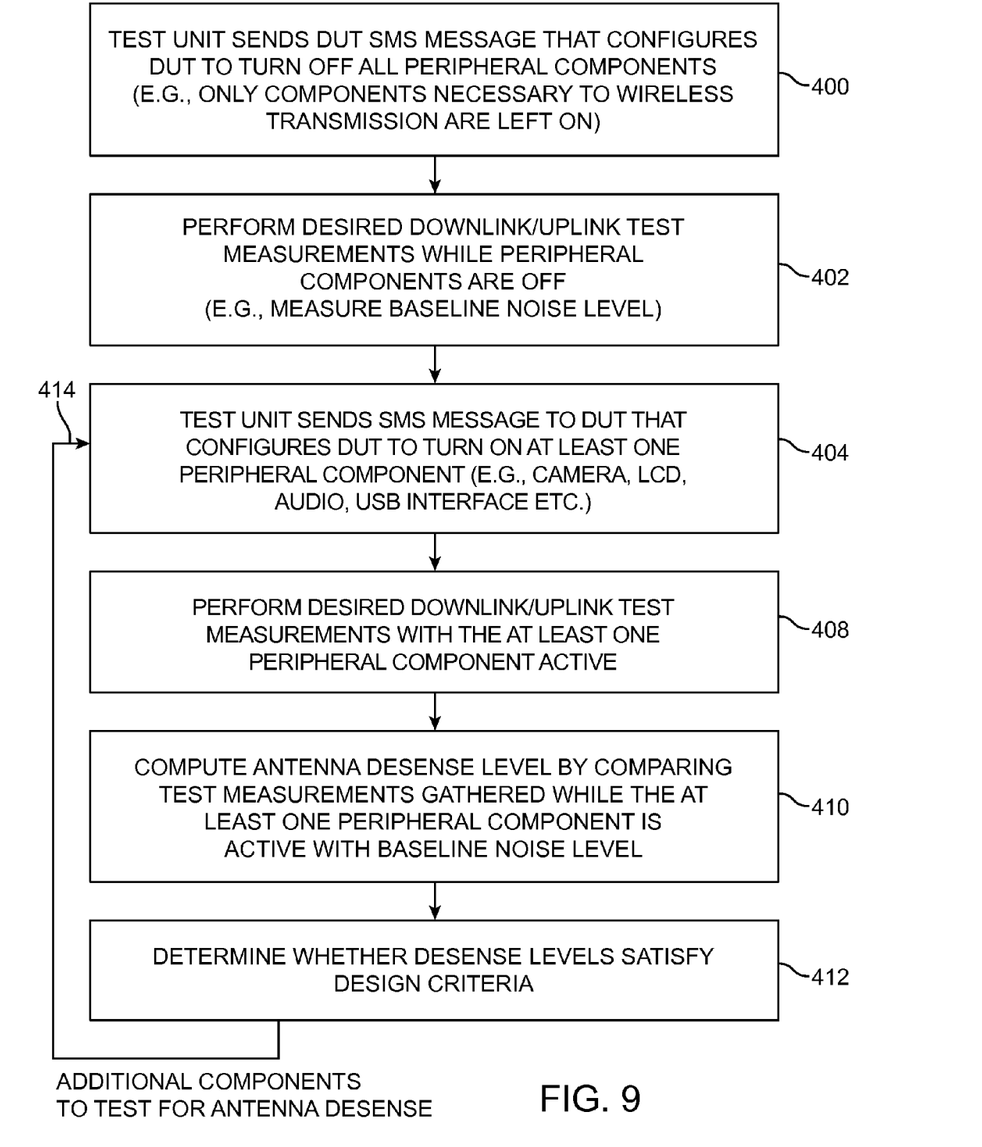
FIG. 9 is a flow chart of illustrative steps involved in computing an amount by which an antenna in a device under test is desensitized in response to enabling different peripheral accessories in accordance with an embodiment of the present invention.

In another suitable embodiment of the present invention, test unit 106 may broadcast SMS messages that configure DUT 10 to turn on/off selected peripheral devices. FIG. 9 shows illustrative steps involve in performing antenna sensitivity testing (i.e., a test that quantifies the amount by which a peripheral device positively or negatively affects antenna performance). At step 400, test unit 106 may send DUT 10 an SMS message that configures DUT 10 to turn off all peripheral devices (e.g., to power off all device accessories such as the camera module, the display module, the audio module, the LAN transceiver, and other components that are not required for proper wireless transmission using the current antenna under test). At step 402, test unit 106 may gather downlink/uplink test data from DUT 10 while the peripheral devices are deactivated to measure a baseline noise level.

At step 404, test unit 106 may send another SMS message that configures DUT 10 to turn on at least one peripheral device. At step 408, test unit 106 may be used to gather downlink/uplink test measurements on DUT 10 while the at least one peripheral device is powered on. At step 410, test host 104 may be used to compute an antenna desensitivity level (e.g., a level of noise increase from the baseline noise level introduced as a result of turning on the at least one peripheral device) by comparing the test measurements gathered while the at least one peripheral device is active with the baseline noise level.

At step 412, the result of the comparison made during step 410 may be used to determine whether or not the desensitivity level is acceptable. If the performance degradation introduced as a result of the active peripheral device exceeds a predetermined threshold, DUT 10 may be marked as being vulnerable to the interference generated from that peripheral device. In such scenarios, proper shielding may be provided to prevent noise coupling between the current antenna under test and the problematic peripheral device. If the performance degradation is minimal (i.e., if the performance degradation introduced as a result of the active peripheral device is less than the predetermined threshold), DUT 10 may be marked as being insensitive or well-shield with respect to that peripheral device. Processing may loop back to step 404 to test the effect of other peripheral devices, as indicated by path 414. If desired, more than one peripheral component may be simultaneously activated to measure the combined effect of the two or more activated peripheral components.

Test methods of the type described in connection with FIGS. 5, 6, 8, and 9 are merely illustrative and do not serve to limit the scope of the present invention. If desired, SMS messages, MMS messages, and other types of text/data messaging services may be conveyed between DUT 10 and test unit 106 (e.g., so that control signals may be transmitted from test unit 106 to DUT 10 and so that test data may be transmitted from DTU 10 to test unit 106).

The foregoing is merely illustrative of the principles of this invention and various modifications can be made by those skilled in the art without departing from the scope and spirit of the invention. The foregoing embodiments may be implemented individually or in any combination.

What is claimed is:

1. A method for using a test station to test a device under test having wireless communications circuitry and peripheral input-output devices, wherein the wireless communications circuitry includes antenna circuitry, and wherein the test station includes a test unit, the method comprising:

with the test unit, sending a first text message that places the wireless communications circuitry in a first operating mode;

with the test unit, sending a second text message that places the wireless communications circuitry in a second operating mode that is different than the first operating mode, wherein the first and second text messages are sent using Short Message Service, wherein placing the wireless communications circuitry in the first operating mode comprises configuring the wireless communications circuitry to communicate using a first wireless network technology and to switch into use a first portion of the antenna circuitry, and wherein placing the wireless communications circuitry in the second operating mode comprises configuring the wireless communications circuitry to communicate using a second wireless network technology that is different than the first wireless network technology and to switch into use a second portion of the antenna circuitry that is different than the first portion;

while the test unit is communicating with the device under test using the first wireless network technology, gathering first radio-frequency test measurements from the device under test using the test unit;

while the test unit is communicating with the device under test using the second wireless network technology, gathering second radio-frequency test measurements from the device under test using the test unit;

determining whether the device under test satisfies design criteria by analyzing the first and second radio-frequency test measurements; and selectively turning on at least one of the peripheral input-output devices while the device under test is operating in the first operating mode, wherein the peripheral input-output devices comprises devices selected from the group consisting of: a camera module, a display module, an audio module, a data connection module, and a wireless local area network communications module.

2. The method defined in claim 1 wherein the wireless communications circuitry includes at least first and second wireless transceiver circuits and wherein placing the wireless communications circuitry in the first operating mode comprises selectively enabling at least one of the first and second wireless transceiver circuits.

3. The method defined in claim 1 wherein the wireless communications circuitry includes a plurality of antennas and wireless transceiver circuits and wherein placing the wireless transceiver circuitry in the first operating mode comprises selectively coupling a portion of the antennas to at least one of the wireless transceiver circuits.

4. A method for using a test station to test a device under test, wherein the test station includes a test unit, the method comprising:

performing path loss calibration operations to determine a path loss between the test unit and the device under test;

while the test unit is communicating with the device under test using a first wireless communications protocol, sending control signals from the test unit to the device under test via Short Message Service, wherein the control signals configure the device under test to communicate with the test unit using a second wireless communications protocol that is different than the first wireless communications protocol;

while the test unit is communicating with the device under test using the first wireless communications protocol, gathering first radio-frequency test measurements from the device under test using the test unit;

while the test unit is communicating with the device under test using the second wireless communications protocol, gathering second radio-frequency test measurements from the device under test using the test unit; and determining whether the device under test satisfies design criteria by analyzing the first and second radio-frequency test measurements.

5. The method defined in claim 4 wherein the first and second wireless communications protocols comprises wireless communications protocols selected from the group consisting of: cellular telephone communications protocols, wireless local area network communications protocols, and internet protocols.

6. A method for using a test station to test a device under test, wherein the test station includes a test unit, the method comprising:
    with the test unit, sending radio-frequency test signals to the device under test;
    with the test unit, receiving a text message from the device under test, wherein the text message includes test data computed using the device under test, wherein the test data is stored on the device under test and wherein the test data comprises measurements selected from the group consisting of: bit error rate measurements, symbol error rate measurements, frame error rate measurements, signal-to-noise ratio measurements, receive power level measurements, receive signal strength indicator measurements, and receive signal code power measurements;
    with the test unit, sending an additional text message to the device under test, wherein the device under test includes a plurality of antennas and wireless transceiver circuits, and wherein sending the additional text message to the device under test comprises directing the device under test to communicate using a different wireless network access technology by configuring the device under test to selectively couple a portion of the antennas to at least one of the wireless transceiver circuits; and
    determining whether the device under test satisfies design criteria by analyzing the test data.

7. The method defined in claim 6 wherein receiving the text message comprises receiving the text message using Short Message Service.

8. The method defined in claim 6 wherein the device under test includes a plurality of peripheral input-output devices, the method further comprising:
    determining how a selected one of the plurality of peripheral input-output devices affects radio-frequency performance of the device under test by selectively turning on the selected peripheral input-output devices while the device under test is receiving the radio-frequency test signals from the test unit, wherein the peripheral input-output devices comprises devices selected from the group consisting of: a camera module, a display module, an audio module, a data connection module, and a wireless local area network communications module.

* * * * *